Oct. 25, 1966 T. J. McKEY 3,281,176

DOOR LOCK

Filed Aug. 21, 1964 2 Sheets-Sheet 1

INVENTOR.
THOMAS J. MCKEY
BY
Carl J. Barbee
ATTORNEY

Oct. 25, 1966
T. J. McKEY
3,281,176
DOOR LOCK
Filed Aug. 21, 1964
2 Sheets-Sheet 2
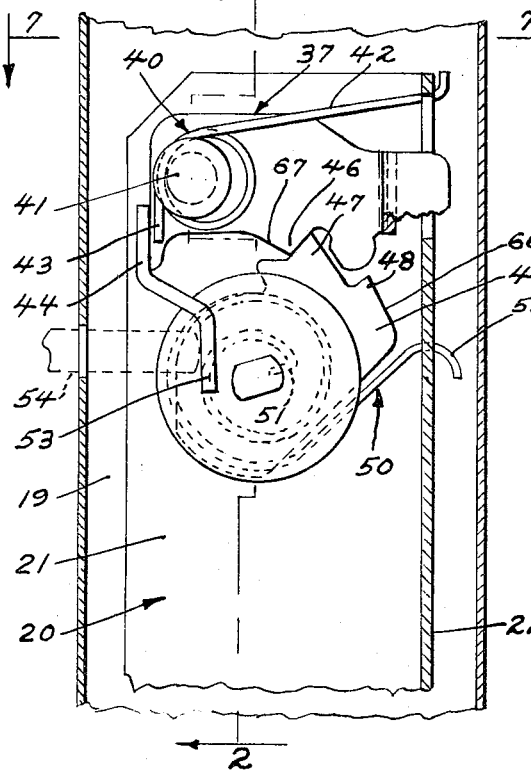
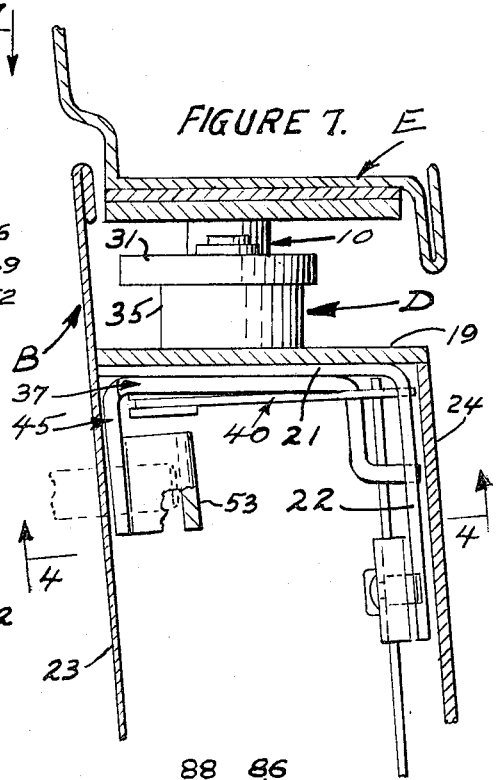
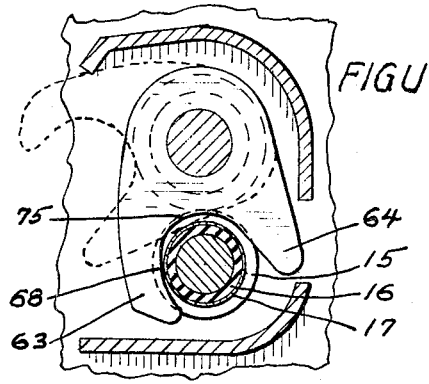
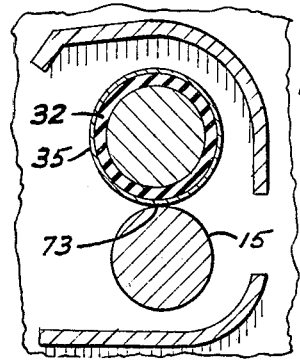
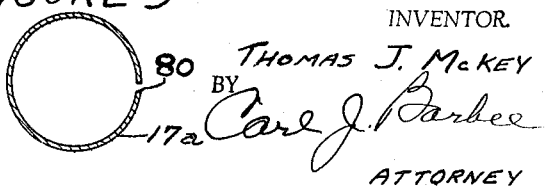
INVENTOR.
Thomas J. McKey
BY Carl J. Barbee
ATTORNEY United States Patent Office 3,281,176
Patented Oct. 25, 1966

3,281,176
DOOR LOCK
Thomas J. McKey, Grosse Pointe, Mich., assignor to American Motors Corporation, Kenosha, Wis., a corporation of Maryland
Filed Aug. 21, 1964, Ser. No. 391,171
4 Claims. (Cl. 292—216)

The invention relates to a locking mechanism for locking a vertically hung swinging door with reference to its door frame.

The invention has particular reference to a locking mechanism of the type suitable for use on an automobile in which the locking mechanism is subjected to various vibratory movements during operation of the vehicle.

In locking an automobile door relative to its frame, it is desirable to take into account vertical vibrations, such as would be occasioned when travelling over rough roads. Other vibrations generally of the horizontal type, whether transverse to or longitudinally of the vehicle should also be taken into account. Additionally, it is desirable to consider the noise factor involved in the "slamming" of a vehicle door shut and to consider the possibility of accidental unlatching due to vibratory conditions.

The locking mechanism defined hereinafter is effective in reducing noise from door slamming as well as reducing tendency of door rattle or accidental unlatching during operation of the vehicle.

The principal object of the invention, then, is to provide a locking mechanism which suitably remedies the aforementioned problems.

A further object is to provide a locking mechanism in which elastic bushings are employed for reducing door rattle and door slamming noise.

A further object is to provide a locking mechanism in which a protective housing also serves as a bearing support and provides a cam surface for coacting with the lock keeper.

A further object is to provide a locking mechanism in which the keeper includes a boss for coacting with an elastically mounted bushing on the lock fork shaft.

Other objects and advantages will be apparent from the ensuing specification and appended drawings in which:

FIGURE 4 is an end view taken on the line 4—4 of FIGURE 7 with certain conventional components, not pertinent to the inventive subject matter, removed.

FIGURE 5 is a fragmentary sectional view taken on the line 5—5 of FIGURE 2.

FIGURE 6 is a fragmentary sectional view taken on the line 6—6 of FIGURE 2.

FIGURE 7 is a sectional plan view of the locking mechanism taken on the line 7—7 of FIGURE 4 with the door and door frame shown fragmentarily.

FIGURE 8 is an end view similar to FIGURE 3 and showing a modified form of the invention.

FIGURE 9 is an enlarged sectional detail view of the keeper sleeve of FIGURE 8.

Figure 1:
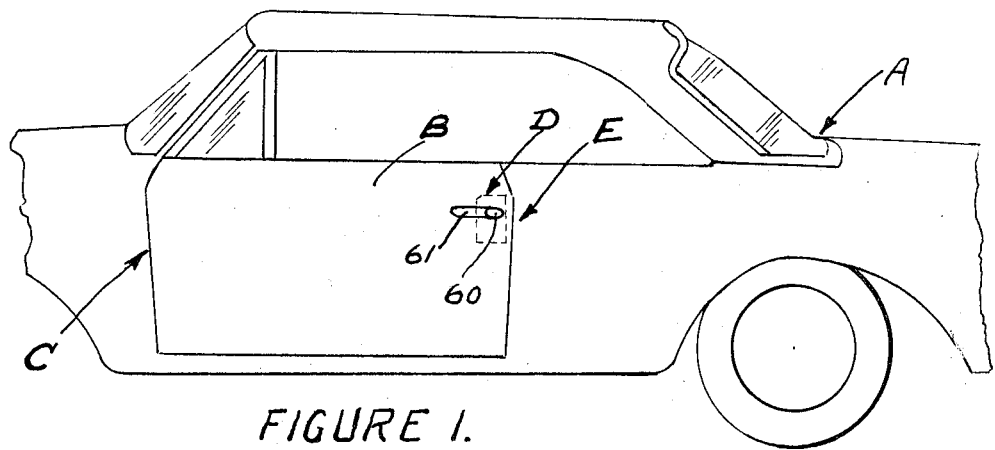
FIGURE 1 is a fragmentary side elevational view of an automotive vehicle employing the subject locking mechanism.
Figure 2:
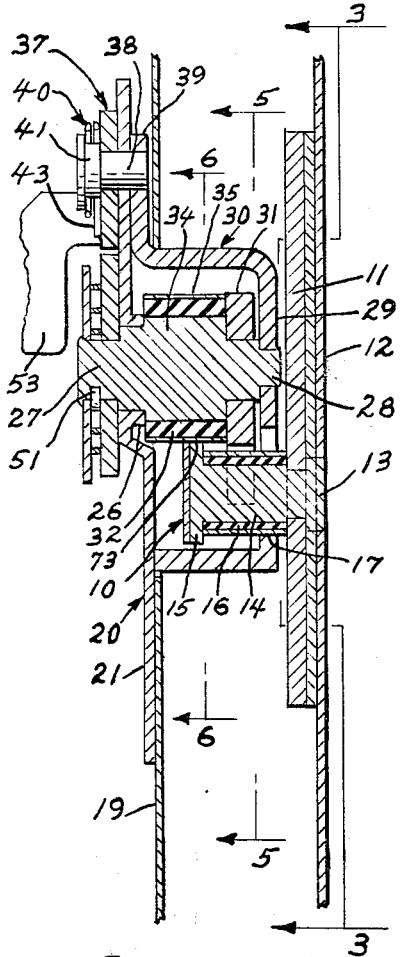
FIGURE 2 is a sectional view of the locking mechanism taken on the irregular line 2—2 of FIGURE 4.

In FIGURE 1, I have shown a portion of an automobile A in which the door B is hingedly carried at its forward edge C on the vehicle body. The locking mechanism D is mounted at the rearward edge of the door for coacting with the door frame E. In general, the axes of the hinges (not shown) are arranged so that the door swings outwardly from the vehicle body about an axis which is substantially vertical.

The locking mechanism includes a keeper identified generally by the numeral 10 which is anchored to the support plate 11 which is securely fastened to the door frame end wall 12. The keeper includes a rigid pin member having one end 13 securely anchored to the support plate and door frame wall and having a diametrically enlarged body portion 14. A boss 15, in the form of a diametrically enlarged annular flange, is formed at the free end of the keeper pin. An elastic tubular bushing 16, formed of rubber or some similar elastic material, encompasses the body portion 14 and a rigid tubular sleeve 17 encompasses the elastic bushing. The bushing and sleeve are telescopically mounted on the pin body prior to anchoring the pin to the door frame.

The lock assembly which is mounted on the end wall 19 of the door includes an L shaped bracket 20 having an end wall 21 and a side wall 22, the end wall 21 being securely fastened to the door end wall 19. The bracket is mounted interiorly of the door between the exterior door panel 23 and the interior door panel 24.

The bracket wall 21 has an inwardly directed bearing boss 26 which provides rotatable bearing support for the locking fork shaft 27. The other end of the shaft has a diametrically reduced portion 28 rotatably carried in a suitable opening formed in the end wall 29 of the guard or housing, identified generally by the numeral 30. The latching element or locking fork 31 is secured to the fork shaft so as to rotate therewith. A tubular bushing 32, formed of rubber or some similar elastic material, encompasses the diametrically enlarged body portion 34 and a rigid tubular sleeve 35 encompasses the elastic bushing. The bushing and sleeve are assembled onto the shaft prior to assembling the locking fork thereto.

An actuating lever 37 is pivotally mounted on pin 38, the end of which is secured in the tongue portion 39 of housing 30. A torsion spring 40 has its eye portion encircling the head 41 of the pin and one leg of the spring 42 extends through a suitable opening in bracket wall 22 and the other leg 43 engages the upper end 44 of the tongue 45 which is formed integrally with the actuating lever. The torsion spring thus continuously urges said lever in a clockwise direction (viewing FIGURE 4) about the axis of pin 38. The actuating lever has a pawl tooth 46 formed at its lower edge which coacts with ratchet teeth 47 and 48 which are formed on the ratchet member 49. The ratchet member is anchored to the locking fork shaft so as to be rotatable therewith and the range of rotative movement of the shaft and ratchet member is reflected as the range of rotative movement of the locking fork 31. A torsion spring 50 has one end 51 anchored in the fork shaft and its other end 52 extending through a suitable opening in bracket wall 22 and the spring continuously urges the ratchet member in counter-clockwise direction, viewing FIGURE 4. The tongue 45 of the actuating lever is provided with a downwardly depending end 53 against which the lock releasing pin 54 engages, said pin being manually operable from the exterior side of the door.

That portion of the locking mechanism by which the door may be unlocked from inside of the vehicle is not shown since it forms no part of the invention.

*Operation*

Figure 3:
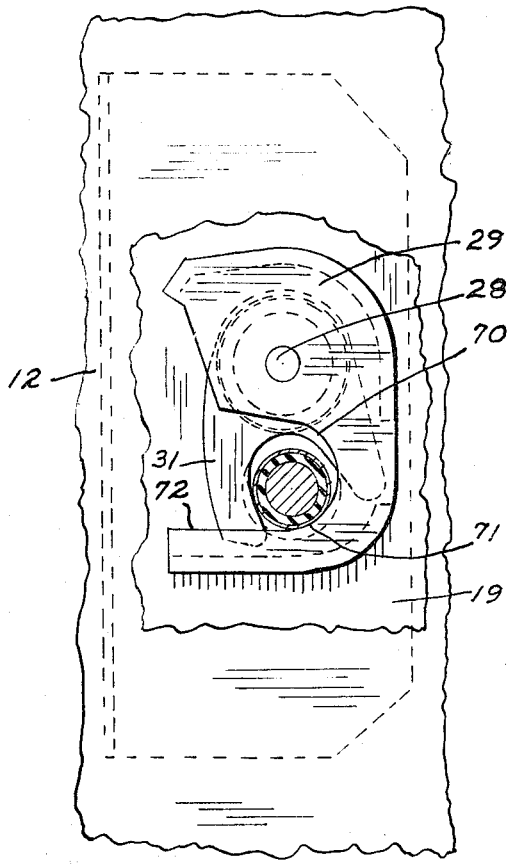
FIGURE 3 is a fragmentary end view taken on the irregular line 3—3 with the door frame wall broken away to reveal the locking mechanism.

Assuming that the vehicle door is closed and is to be opened from the outside of the vehicle, a suitable push button 60 mounted adjacent the handle 61 is manually pushed inwardly causing the actuating pin 54 to engage lever tongue 53 rotating the actuating lever counter-clockwise, viewing FIGURE 4. The pawl tooth 46 is swung upwardly so that the ratchet teeth 47 and 48 will clear same as the ratchet member rotates counter-clockwise, viewing FIGURE 4, under the influence of spring 50. The rotation of the ratchet member, of course, is accompanied by rotation of the locking fork shaft 31 and the locking fork 31 which rotates with the shaft. The leg 63 of the locking fork is swung clockwise, viewing FIGURES 3 and 5, about the axis of the fork shaft until it reaches a height in which it will clear the keeper as the door is opened. The trailing leg 64, under the influence of spring 50, engages the keeper to effect initial door opening movement upon depression of button 60. With the door opened, the locking fork will be in the position as indicated in dotted lines in FIGURE 5. The manual closing of the door will automatically effect a re-locking of the locking fork relative to the keeper as follows. Upon the initial closing of the door, the trailing leg 64 of the locking fork engages the keeper thereby causing rotation of the locking fork in counterclockwise direction, viewing FIGURE 5. As the locking fork is rotated in this direction, the ratchet member is likewise rotated in clockwise direction, viewing FIGURE 4. The edge 66 of the ratchet engages the forward edge 67 of pawl tooth 46 causing rotation of the actuating lever 37 counter-clockwise, viewing FIGURE 4, until the tooth 48 travels past the pawl tooth and until tooth 47 also travels past the pawl tooth. Then the door is fully closed, at which time ratchet tooth 47 is engaged by pawl tooth 46 under the influence of spring 40, as shown in FIGURE 4. The locking of the pawl tooth 46 with ratchet tooth 47 immobilizes the locking fork and the locking fork shaft thereby keeping the door locked relative to the door frame until the actuating lever 37 is again manually rotated for door opening purposes. The ratchet tooth 48 is a conventional safety or auxiliary latch for locking the door relative to the door frame in a nearly door closed position.

During the closing of the door the cam surface 68 on the locking leg 63 is tightly engaged against the elastically mounted sleeve 17 of the keeper. Due to the elasticity of the bushing 16 the keeper sleeve 17 is capable of being shifted laterally or radially with reference to the axis of the lock fork shaft. As the door approaches fully closed position, the throat 70 formed in the housing end wall 29 accommodates the keeper and the cam surface 71 formed at the inner end of the ramp 72 causes a lateral or radial force to be exerted on the elastic bushing 16 in a direction partially opposite to the radial force exerted by the cam surface 68 of the locking fork leg. Thus, the door end wall is pulled vertically downwardly slightly with reference to the keeper and this vertical downward movement causes the upper edge 73 of the annular boss 15 to tightly engage the rigid sleeve 35 which surrounds the elastic bushing 32. The sleeve 35 being elastically mounted on the lock fork shaft is capable of lateral or radial shifting under the influence of the boss edge 73. Thus, a vertical downward force is exerted on the keeper which counteracts the general upward force being exerted by cam surface 71 and the generally transverse force being exerted by cam surface 68. Thus, the locking components carried on the door are in effect resiliently wedged with reference to the keeper at three circumferentially spaced locations and thus upward and downward movement of the door relative to the keeper is resiliently suppressed, thereby preventing the door from rattling with reference to the door frame. The cam surface 68 of fork leg 63 is tightly engaged against the keeper in order to prevent any movement of the door relative to the door frame in a direction crosswise of the vehicle, thus preventing any door rattle in this respect. It will be noted that the upper end 75 of the throat which is formed between the fork legs is spaced from the keeper when the door is in fully closed position thereby providing for the radially upward deflection of bushing 16 and also providing adequate tolerance conditions needed in volume production of vehicle doors and door frames. The elastic bushings 16 and 32 also permit adequate manufacturing tolerances.

In the modified form of the invention as shown in FIGURES 8 and 9, the keeper includes the tubular sleeve 17a which is made of non-elastic material but is of the split type (as shown best in FIGURE 9) wherein an elongated slot 80 extends throughout the length of the sleeve. Thus, the sleeve is capable of being constricted circumferentially. The upper end 81 of the throat formed between the fork legs 63a and 64a are formed with an arc which may be said to be generated from the axis of the keeper pin when the door is in fully closed position relative to the door frame as shown in FIGURE 8. Thus, the fork encompasses a substantial portion of the circumference of the keeper sleeve 17a tending to cause a constriction of the circumference of the sleeve, since the engagement of the cam surface 71a of housing 29a counteracts the downward force being imposed on the keeper by the locking fork. Such downward force on the door relative to the door frame is imposed as a result of the wedge 83 which acts against the upper wall 84 of the housing when the door becomes closed. The wedge assumes a position shown in dotted lines in FIGURE 5 when the door is opened, the wedge being reciprocably mounted on pin 95 which is carried by the bracket 86 which is secured to the support plate 11 on the door frame end wall 12. The spring 88 returns the wedge to the dotted line position when the door is opened. Thus, the keeper is tightly engaged from above and below by the fork throat 81 and the cam surface 71a, under the inducement of wedge 83 thereby preventing door rattle in an up and down direction as well as in a direction crosswise of the vehicle. The elastic tubular bushing 16a is deflected radially to permit the necessary constriction of the keeper sleeve 17a when the door becomes closed.

I claim:

1. A locking mechanism for locking a swinging door relative to a door frame, said locking mechanism comprising:
   (a) a shaft rotatively carried on the door;
   (b) a latching element secured to the shaft for rotation therewith;
   (c) a bumper elastically carried on the shaft;
   (d) a keeper secured to the door frame and projecting into the path of the latching element when the door is swung to closed position relative to the door frame;
   (e) a housing having an end wall overhanging the latching element, said end wall having a throat for accommodating the keeper when the door is in closed position relative to the door frame;
   (f) a cam surface on the housing end wall;
   (g) said keeper including an elastically carried exterior surface for engaging the latching element and the cam surface at circumferentially spaced locations;
   (h) a boss on the keeper for engaging the bumper when the keeper is engaged with the cam surface and
   (i) means for releasably holding the latching element non-rotative when the door is in closed position relative to the door frame.

2. A locking mechanism for locking a swinging door relative to a door frame, said locking mechanism comprising:
   (a) a locking fork shaft rotatively carried on the door;
   (b) a locking fork secured to the shaft;
   (c) an elastic bushing mounted on the shaft;
   (d) a non-elastic sleeve encompassing the bushing;
   (e) a keeper secured to the door frame and projecting into the path of the locking fork when the door is swung to closed position relative to the door frame;

(f) said keeper including a rigid body portion secured to the door frame, an elastic bushing mounted on the body portion and a non-elastic sleeve encompassing the bushing;
(g) a housing having an end wall overhanging the locking fork, said end wall having a throat for accommodating the keeper when the door is in closed position relative to the door frame;
(h) a cam surface on the housing and end wall;
(i) the non-elastic sleeve on the keeper being engaged by the locking fork and by the cam surface at circumferentially spaced locations;
(j) a boss on the keeper for engaging the sleeve on the locking fork shaft when the keeper sleeve is engaged with the cam surface and
(k) means for releasably holding the locking fork non-rotative when the door is in closed position relative to the door frame.

3. A locking mechanism for locking a swinging door relative to a door frame, said locking mechanism comprising:
(a) a shaft mounted on the door;
(b) a latching element carried on the shaft and being rotative about the axis of the shaft;
(c) an elastically mounted bumper on the shaft;
(d) a keeper secured to the door frame and projecting into the path of the latching element when the door is swung to closed position relative to the door frame;
(e) a housing having an end wall overhanging the latching element, said end wall having a throat for accommodating the keeper when the door is in closed position relative to the door frame;
(f) a cam surface on the housing end wall;
(g) said keeper including an elastically carried exterior surface for engaging the latching element and the cam surface at circumferentially spaced locations and said keeper having a portion engaging the bumper at a location circumferentially spaced from the locations of engagement of the keeper with the latching element and the cam surface; and
(h) means for releasably holding the latching element non-rotative when the door is in closed position relative to the door frame.

4. Apparatus as set forth in claim 3 wherein the axis of the keeper is substantially parallel with the axis of the bumper.

References Cited by the Examiner
UNITED STATES PATENTS

| | | |
|---|---|---|
| 2,458,751 | 1/1949 | Voight. |
| 2,814,193 | 11/1957 | Roethel _____ 70—142 |
| 2,987,336 | 6/1961 | Kramer _____ 292—52 |
| 3,065,013 | 11/1962 | Pickles _____ 292—280 |
| 3,111,339 | 11/1963 | Nadeau _____ 292—216 |
| 3,123,390 | 3/1964 | Sandor et al. |
| 3,206,240 | 9/1965 | Roethel _____ 292—241.12 X |

FOREIGN PATENTS 799,420  8/1958  Great Britain.

EDWARD C. ALLEN, *Primary Examiner.*
RICHARD E. MOORE, *Examiner.*